J. WOODRUFF.
Sleeping-Cars.
No. 6,019. Reissued Aug. 18, 1874.
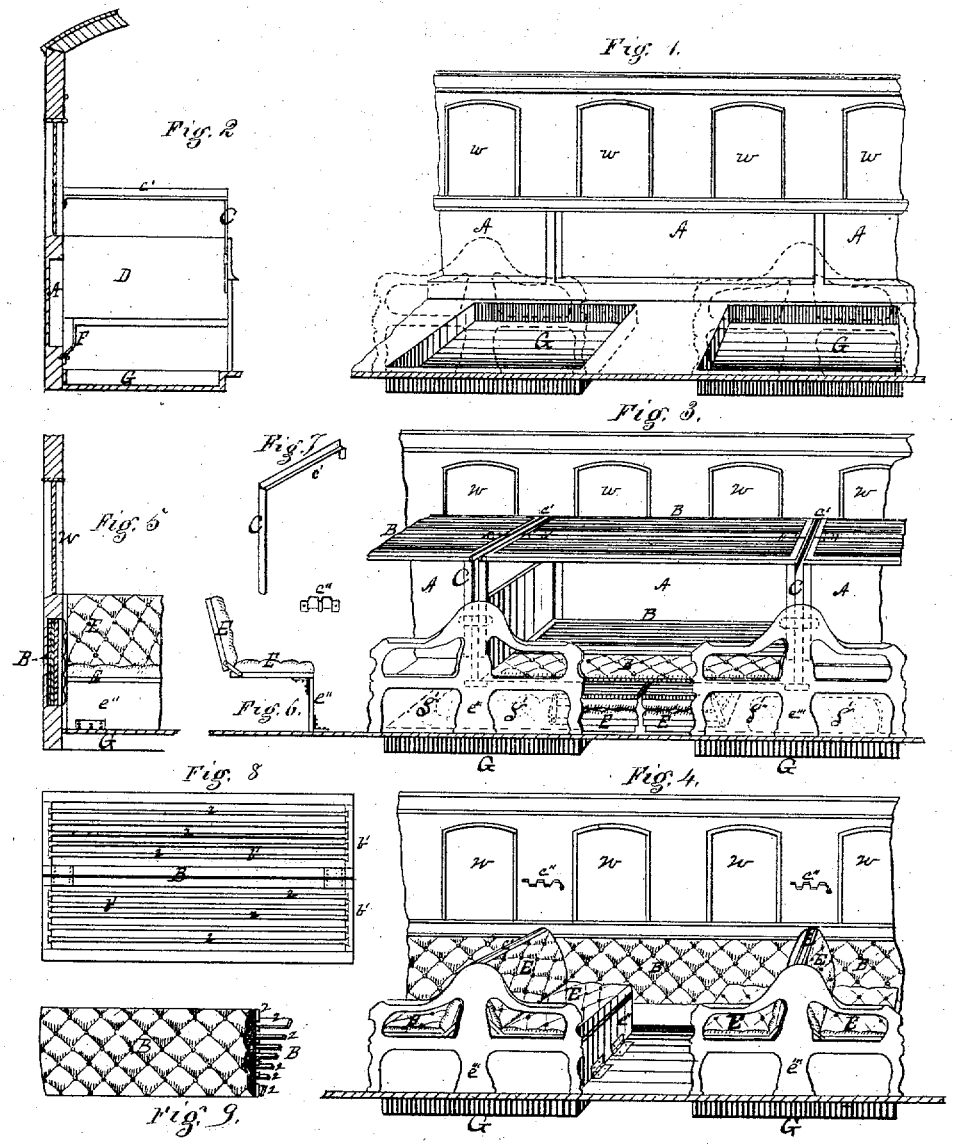
Witnesses { R. R. Baelz
Frederick Standish
Inventor Jonah Woodruff
by Bakewell & Kerr
Attorneys
THE GRAPHIC CO. PHOTO-LITH. 39 & 41 PARK PLACE, N.Y.

UNITED STATES PATENT OFFICE.

JONAH WOODRUFF, OF PHILADELPHIA, PENNSYLVANIA, ASSIGNOR, BY MESNE ASSIGNMENTS, TO THE WOODRUFF SLEEPING AND PARLOR COACH COMPANY.

IMPROVEMENT IN SLEEPING-CARS.

Specification forming part of Letters Patent No. 105,288, dated July 12, 1870; reissue No. 6,019, dated August 18, 1874; application filed April 9, 1874.

*To all whom it may concern:*

Be it known that I, JONAH WOODRUFF, of Philadelphia, in the county of Philadelphia and State of Pennsylvania, have invented a new and useful Improvement in Sleeping-Cars; and I do hereby declare the following to be a full, clear, and exact description thereof.

My invention relates to the construction of the supporting-platforms for berths along the sides of the car, and to their disposal when not required to be used for such purpose, and also to the disposal of the bedding under the same circumstances, in such a manner as to do away with the unsightly appearances and obstructions consequent upon the mode of disposing of the said parts by suspending them overhead, as required in the sleeping-cars now in use on the main lines of railroads, and to do away with all other objectionable indications of the presence of such things when the car is not required to be arranged or adjusted for sleeping, and at the same time to give to the whole interior of the car as much room and as neat and tidy an appearance as can be given to those passenger-cars which are not provided with sleeping-berths.

Figure 1 is a perspective view of the interior of a car, showing portions of the side and floor of the same, and embodying parts of my invention. Fig. 2 is a transverse section of Fig. 1, with the addition of another portion of my invention. Fig. 3 is a perspective view of a part of the interior of the car, showing the platform, seats, and backs arranged for the reception of the bedding, &c. Fig. 4 is a perspective view of the interior of the car, as arranged or adjusted when not required for sleeping. Fig. 5 is a transverse section of Fig. 4, but showing only a part of the back and seat. Fig. 6 is an end view of a back and seat in the elevated position, in which they will rest upon the supporting-frame of the same when in use. Fig. 7 is a perspective view of one of the standards for supporting the upper platform, as applied in Fig. 3. Fig. 8 is a plan view of one of the platforms for supporting the bedding. Fig. 9 is a section of one-half of the said platform, as when upholstered to form the closing panel for any one of the recesses in the sides of the car.

In the sides of the car, along beneath the windows *w w*, I make recesses A, each in length corresponding with the distance between the back frames or partitions of two facing seats, or with the length of the platforms B, which are to support or form the bottoms of the upper and lower berths of that division of the seats, and of sufficient depth to receive two of the said platforms constructed and applied therein, as will now be described. The platforms B are preferably of the skeleton or open form, and each consists of two like frames, *b′ b′*, made with longitudinally-arranged wooden slats 2 2, and hinged together so as to fold in half-widths. (See Fig. 8.) Two of these folding platforms are intended to be placed in each of the recesses A, in the sides of the car, one for the lower berth, and the other for the berth directly above it. One-half of the folding-platform B intended for the lower berth, is upholstered, as represented in Fig. 9, or otherwise covered and ornamented on one side, and this one is to be placed last in its respective recess A, and with its upholstered or covered ornamental side outward, thus filling out the recess A, and showing, as an upholstered or ornamental panel thereat, between the two fronting seats of the division, when the car is not required for sleeping purposes, as represented in Fig. 4. Each of the platforms B of the upper berths is supported by the iron frame C, the vertical part of which slides up and down in the end frame of the seat on one side of the partition D, which supports the backs of two abutting seats, its horizontal part *c′* hooking into its appropriate staple or socket *c″*, fixed to the side of the car, at a proper height for the upper berth, (see Fig. 3,) and so that when the upper platform is removed it can be slipped down out of sight, and rest with its horizontal part *c′* upon the upper edge of the partition D between the two backs of the abutting seats, (see Fig. 4,) or be drawn out and disposed of upon the bedding in recess G. The upholstered or cushioned seat E and back E are hinged together, and the seat to the panel $e''$, which is hinged to the floor, all in such a manner that, when the platforms B are to be applied, they can be readily folded down upon the floor between the two facing seat-frames, as represented in Fig. 3, or, after the platform has been removed for the purpose, be raised up into the position shown in Figs. 4 and 6, one end of the seat resting on a suitable bracket, F, (see Fig. 2,) the other end on a ledge-support on the inner side of the end frame $e'''$, and the panel $e''$ closing the front opening under the said seat and back, as shown in Fig. 4. Directly under each two abutting seat-frames I make a correspondingly-sized recess, G, in the floor of the car, (see Figs. 1 and 2,) for the reception of the appropriate bedding $g'$, &c. (See Fig. 3.) The lower openings in the end frames $e'''$ are intended to be closed by panels, as in Fig. 4, or otherwise, so that the said bedding, curtains, &c., cannot be seen after they are thus closed up in the said recess G.

It will now be understood, without further description, that the upholstered seats and backs of any two facing each other can be instantly folded down into the positions shown in Fig. 3, the two platforms B B and the bedding $g'$ $g'$, taken out of their respective recesses A G, the sliding frames C C raised up or slipped into position in the frame $e'''$, and hooked fast into the staples $c''$, and the two platforms B B placed the one upon the said frames, and the other upon the former-supports of the cushioned seats E E, as shown in Fig. 3, and the bedding then placed thereon, thus, in a few moments, providing ample and comfortable sleeping-berths for the four occupants of the two seats in the same division of the car, and, if desired, curtains may be readily suspended around the berths.

It will also be understood that, with equal or even greater facility, the curtains, bedding, and platforms can be folded and replaced in their respective recesses, and the cushioned seats and backs E E raised up into their original positions upon the respective frames, all as represented in Fig. 4, thus disposing of everything that would indicate the former arrangements for sleeping, and restoring the car to its original neat, tidy, and capacious condition for sitters.

Another important advantage incident to my improvements may be mentioned, viz., the weight of material required is nearly two thousand pounds less than what is required for each of the sleeping-cars now in use, and, besides, this reduction is mainly from the upper part of the car.

I am aware that it has been suggested that the panel between the windows of ordinary passenger-cars be hinged, so as to be let down for use as a table, but this I do not claim.

I claim as my invention—

1. A berth-platform, B, hinged along its middle, so as to fold in half-widths, and with one of its exterior sides covered, so as to present an upholstered or finished panel, in combination with the recess A, substantially as and for the purposes set forth.

2. The removable angle-pieces C C, in combination with the end frames $e'''$ of the seats, and the sockets or staples $c''$ in the sides of the car between the windows, as and for the purpose set forth.

3. The combination of the upholstered backs and seats E E, and the panel $e''$ with the floor of the car, said parts being hinged together, substantially as and for the purposes set forth.

4. The bottom of the car having the recesses G G directly beneath each pair of the abutting seats, as and for the purpose set forth.

5. The space in the sides of the car below the windows and between the transverse partitions divided into a series of recesses A A, of suitable length, width, and depth, for the reception of berth-platforms.

In witness whereof I, the said JONAH WOODRUFF, have hereunto set my hand.

JONAH WOODRUFF.

Witnesses:

E. T. MATHEWS,

WM. C. WEAVER.